(12) United States Patent
Albert

(10) Patent No.: US 8,719,279 B2
(45) Date of Patent: May 6, 2014

(54) SYSTEM AND METHOD FOR ASSESSING AND RANKING NEWSWORTHINESS

(75) Inventor: David Kenneth Albert, Slingerlands, NY (US)

(73) Assignee: Strategic Communication Advisors, LLC., Slingerlands, NY (US)

(*) Notice: Subject to any disclaimer, the term of this patent is extended or adjusted under 35 U.S.C. 154(b) by 149 days.

(21) Appl. No.: 13/404,157

(22) Filed: Feb. 24, 2012

(65) Prior Publication Data
US 2013/0226933 A1    Aug. 29, 2013

(51) Int. Cl.
*G06F 17/30* (2006.01)
(52) U.S. Cl.
USPC .................... 707/748; 707/723; 707/E17.009
(58) Field of Classification Search
None
See application file for complete search history.

(56) References Cited

U.S. PATENT DOCUMENTS

| 2007/0073708 A1* | 3/2007 | Smith et al. ..................... 707/10 |
| 2009/0063646 A1* | 3/2009 | Mitnick ......................... 709/206 |
| 2010/0287210 A1* | 11/2010 | Olof-Ors et al. ............... 707/803 |
| 2012/0259853 A1* | 10/2012 | Khasnis et al. ................ 707/739 |
| 2012/0278336 A1* | 11/2012 | Malik et al. ................... 707/748 |

* cited by examiner

*Primary Examiner* — Anteneh Girma
(74) *Attorney, Agent, or Firm* — Hesin Rothenberg Farley & Mesiti P.C.

(57) ABSTRACT

A system and method for determining a newsworthiness score for a news story, including the steps of receiving data describing a news story from a client, comparing the data describing the news story to a set of pre-determined factors, locating the factors that are present on the set of pre-determined factors in the data, adding pre-calculated values to a running total, the newsworthiness score, for each factor found in the data.

23 Claims, 13 Drawing Sheets

SYSTEM AND METHOD FOR ASSESSING AND RANKING NEWSWORTHINESS

FIELD OF INVENTION

The present invention provides a system and method for assessing and ranking the newsworthiness of a potential news story.

BACKGROUND OF INVENTION

Organizations have an interest in generating news coverage for their products, programs, services, or public policy issues. Such coverage can heighten public awareness and help an organization achieve its strategic goals.

Businesses, for example, may seek news media coverage of a particular product or service in order to increase sales or revenue, launch a new product, or cultivate business leads. Nonprofit organizations may seek media coverage in order to support fundraising efforts, promote an event, and increase their visibility among volunteers, donors or members. Organizations involved in advocacy may seek news media coverage in an effort to shape public opinion, influence public policy, or build support for an initiative at the local, state or federal level. Publicly traded companies may seek publicity to attract new investors, increase shareholder value, and ultimately lower the cost of capital. Even specific individuals such as writers, performing artists, athletes, speakers and consultants may seek news media coverage in an effort to establish themselves as a go-to resource for the media, publicize their expertise and advance their careers.

Favorable news media coverage can also help an organization achieve broader goals such as establish a brand or reputation, build customer loyalty, improve employee morale, as well as communicate with the general public or a targeted constituency on a given topic.

But while many business leaders, nonprofit executives, elected officials and government employees seek to obtain positive news coverage in print, broadcast or online media, they do not know if their news item measures up to news media standards. They may also not know enough about what constitutes news to go about generating a viable story.

To make obtaining coverage that much more difficult, newsrooms typically receive many potential news stories each day. Television newsrooms in Florida receive an average of 372 news releases per day, yet only about 4 percent of those releases are actually considered as potential stories. A major market newsroom gets hundreds of press releases every day and often the decision on whether a given story receives press coverage is made in a matter of seconds.

Therefore, individuals seeking to generate news coverage or publicity for their organization need to know very specifically what reporters and editors look for when selecting news stories. While some individuals may be able to hire internal or external public relations counsel to help in these efforts, such counsel can be expensive, the need for publicity may not be frequent enough, or the organization may have other internal constraints that prevent or limit it from obtaining such counsel.

A need exists for a system and method to assist individuals and organizations who seek media coverage in assessing whether their news story ideas and news releases will receive coverage and if not, assist them in shaping stories that will receive the desired coverage.

A need exists for organizations to have an advance warning system to determine if circumstances or events exist that could lead to adverse coverage of their organization, product, etc. in the news media.

SUMMARY OF INVENTION

An object of the present invention is to provide users with a system and method of evaluating and ranking the newsworthiness of a given idea, and estimating the likelihood that the idea will generate media coverage in their local market or relevant industry trade media outlet.

A further object of the present invention is to provide a system and method for assessing and ranking the newsworthiness of a news media story idea.

A further object of the invention is to provide a system and method for increasing the newsworthiness of an idea.

A further object of the invention is to provide a system and method for generating ideas for news stories.

A further object of the invention is to provide a system and method for determining the optimum timing for releasing a news story so the story receives maximum coverage by the media.

A further object of the invention is to provide a system and method for assessing the risk of adverse publicity from a potential news story.

An embodiment of the present invention makes use of objective patterns in news coverage to create a system and method for predicting media response and coverage for future stories. Those patterns are based on a quantitative comparison to records of media inquiries into past events.

The system and method is utilized to give a potential story a numerical score in categories that, based upon past recorded media trends, predict the media interest in this potential story. In an embodiment of the present invention, the two categories in which the potential news story is scored are News Value and Relevance. News Value is a measure of characteristics in the story with a proven record of media interest. Relevance is a measure of the relationship of the story to current events that have received coverage. Together, these scores reflect both the newsworthiness of the content of the story and whether the environment, the news climate, is optimal to support the release of the story.

To determine the News Value Score of a contemplated news story, the following tasks are accomplished: 1) a data store is used to track media inquiries and what news items triggered these inquiries; 2) the data store is analyzed for the presence of "news angles," the common and reoccurring characteristics in news items that triggered inquiries; 3) each news angle is weighted based upon its frequency in the data store; 4) a contemplated news story is scored based upon the presence (or absence) of each individual news angle in this story and the weight assigned to the given news angle; and 5) additional value is added to the score based upon factors related to the news angles that in an analysis of the data in the data store, have revealed themselves to impact the media interest in a news item in a statistically significant manner.

The system and method utilizes intelligence gained from media interest in past events to predict media interest in news stories. The past intelligence is housed in one or more data storage mediums, or data stores, including but not limited to relational databases, spreadsheets, data warehouses, and/or schemas. These data stores are used across different types of organizations including but not limited to, local government entities, global biotechnology companies, and statewide nonprofit trade associations. Over a course of time, these data stores are used to record every media inquiry made and the details of the item, i.e., the newsworthy event, that was inquired about.

After a data store is established, its content is analyzed and segmented into classifications termed news angles. These news angles represent common features of the items in the database that provide a basis for the media's inquiry upon the item. Spot news, which includes unplanned events, such as disasters and/or crimes, is excluded from this analysis because the system and method is used to seek coverage for planned, or predictable news stories.

After identifying which items contain which news angles over the available data stores, a median value for the presence of each news angle is determined for the database as a whole. Based upon these results, each news angle is assigned a tier. A news angle that appears more often than the median will be assigned to a higher tier than a news angle that appears less often than the median. The tiers represent the importance of the presence of this news angle to receiving media coverage across the selected data store(s).

News angles that appear with a higher frequency in a given data store are assigned a higher tier. A higher tier assignment means that the assigned news angle carries a greater importance, indicating that a news story that contains only this news angle has a higher likelihood of receiving media coverage than a story that contains only a news angle assigned to a lower tier. News angles are not mutually exclusive and more than one can appear in a given story.

To assign a News Value Score to a contemplated news story, this system and method evaluates the proposed news story based upon the presence (or absence) of the predetermined news angles. The angles are factored into tiers for the calculation so that more credit is assigned when a potential news story contains a news angle that is assigned to a higher tier. In an embodiment of the present invention, the raw score is converted to a percentage of 100. The percentage score allows an easier comparison to other contemplated news stories.

If there are any exceptional characteristics, i.e., factors related to the news angles that have revealed themselves through an analysis of the data store to impact the media interest in a news item in a statistically significant manner, additional points are added to the score.

To determine the Relevance Score of a contemplated news story, the following tasks are accomplished: 1) a data store is used to track media inquiries, what news items triggered these inquiries, and what actions, events, people, institutions, organizations, announcements, information and/or reports prompted the inquiry or item; 2) the data store is analyzed for the presence of "relevance criteria," which are based upon the source of each news item that triggered inquiries, i.e., what actions, events, people, institutions, organizations, announcements, information and/or reports prompted the inquiry or story; 3) each relevance criterion is weighted based upon its frequency in the data store; 4) a contemplated news story is scored based upon the presence (or absence) of each individual relevance criterion in this story and the weight assigned to the given relevance criterion; and 5) additional value is added to the score or subtracted from the score based upon factors related to the relevance criteria that in an analysis of the data in the data store, have revealed themselves to impact the media interest in a news item in a statistically significant manner.

The Relevance calculation can be based on data in the same data store that impacts the News Value calculation. The Relevance calculation is based on the source of an item, i.e., what actions, events, people, institutions, organizations, announcements, information or reports prompted the inquiry or story. Thus, the source is an environmental factor that assists in determining whether the environment is optimal for release of a contemplated news story.

After a data store is established, its content is analyzed and segmented into classifications termed relevance criteria, which represent common sources that fueled the media's inquiry into recorded items. As with news angles, after identifying which items contain which relevance criteria over the available data stores, a median value for the presence of each relevance criterion is determined for the database as a whole. The relevance criteria are assigned to tiers and criterion that appear with a higher frequency in a given data store are assigned a higher tier.

The news story is evaluated based upon the presence (or absence) of the predetermined relevance criteria. The tiers of the criteria are factored into the calculation so that more credit is assigned when a potential news story contains a relevance criterion that is assigned to a higher tier. In an embodiment of the present invention, the raw score is converted to a percentage of 100. The percentage score allows an easier comparison to other contemplated news stories.

If there are any exceptional characteristics, i.e., factors related to the relevance criteria that have revealed themselves through an analysis of the data store to impact the media interest in a news item in a statistically significant manner, additional points are added to the score. Points are deducted if the relevance criterion that correlates with the contemplated story has been in the news for a period of time that indicates that it is a stale item.

Although the discussed embodiments concern utilizing the system and method of the invention to score potential news stories based on News Value and Relevance Score, one of skill in the art will recognize that the methodology of the present invention can be extended to other newsworthy characteristics and trends in accumulated inquiry data.

DETAILED DESCRIPTION OF THE INVENTION

The present invention provides a system and method for assessing and ranking the newsworthiness of a potential news story.

This system and method can be used to numerically score a potential news story based on factors that assist in predicting whether this news story will receive the desired coverage in the media. This calculation is accomplished based on an analysis of past media reporting trends.

In an embodiment of the present invention, the two factors that are identified are News Value and Relevance. Each factor translates to an individual quantified score; each item is awarded a News Value Score and a separate Relevance Score. The News Value Score represents the presence of characteristics, called news angles, in the story itself, that in past stories have lead to quantifiable media attention. The Relevance Score quantifies whether a potential news story is relevant in the current news climate based upon the presence of relevance criteria. News is often very context-specific, meaning that it is dependent on what is happening on any given day. As a result, the newsworthiness of a given story can increase or decrease based on the current news climate—i.e., what is generating news at the time.

In an embodiment of the present invention, scoring an item based upon its likelihood to garner media attention includes the following steps: 1) collecting information about news items that attracted media inquiries; 2) analyzing news items that received inquiries for trends; 3) quantifying these trends into values; 4) evaluating a contemplated news story and scoring it based upon the established values.

Figure 1:
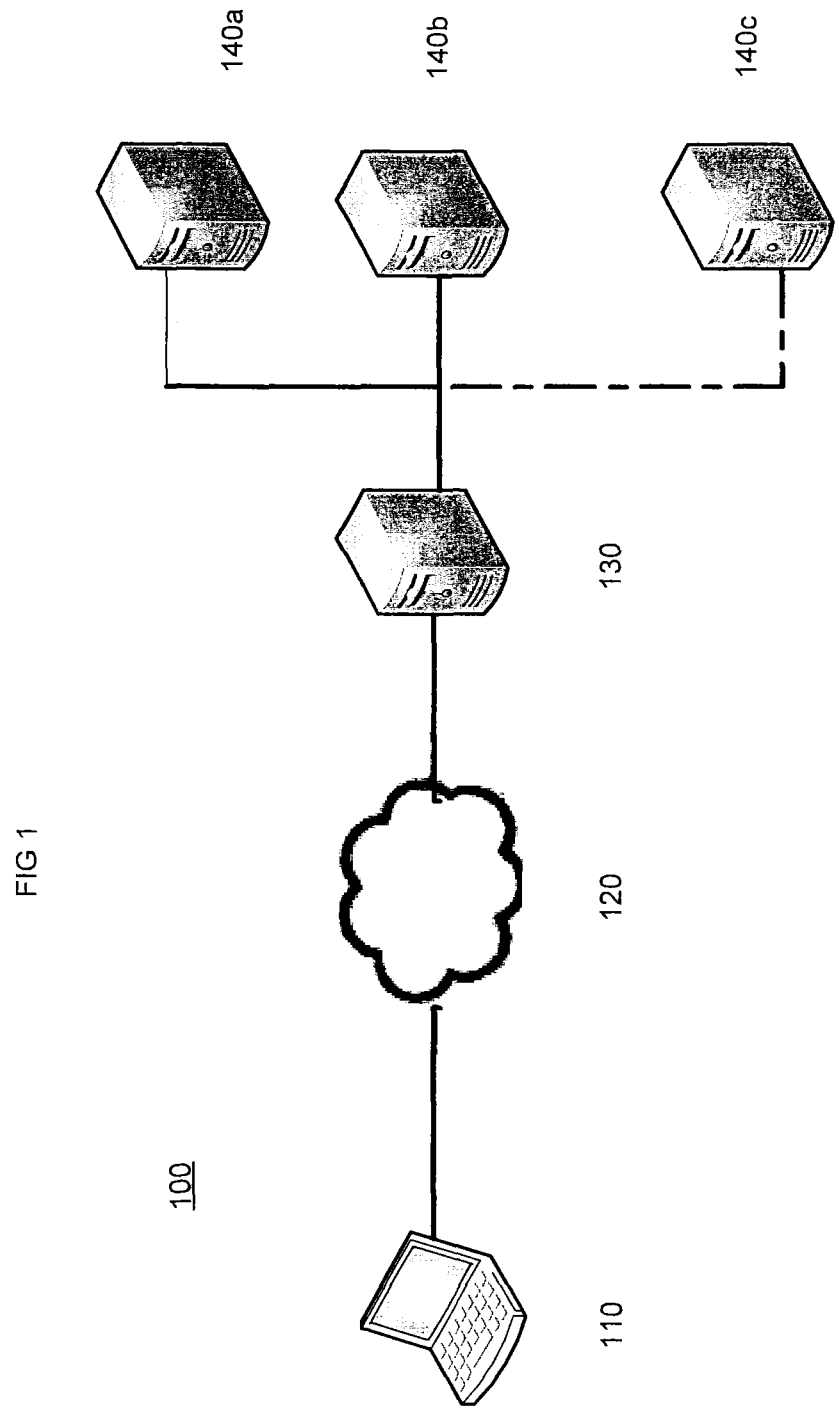
FIG. 1 depicts a technical architecture of an embodiment of the present invention.

FIG. 1 is a technical architecture 100 that can be utilized by an embodiment of the present invention. In this embodiment of the present invention, the method is accessed on a terminal 110 via the Internet 120. The web site is served by a Web Server 130. One or more Database Servers 140a-140n host databases that are accessible to the Web Server 130. When a user enters a story idea on the terminal 110 via a web browser in communication over the Internet 120 with the web site served by the Web Server 130, the Web Server 130 queries the Database Servers 140a-140n to compare the story entered with the existing data set(s) housed in the one or more databases.

Past media success is used as a predictor of future success. Thus, to score each contemplated story for News Value and Relevance, the news item is benchmarked against a data model developed by collecting, segmenting, and analyzing media interest in past events. In an embodiment of the present invention, the data model is based on recording media inquiries to three diverse organizations over the course of a decade. Each media inquiry was precipitated by a news item, or story. The three organization model is merely representative; embodiments can utilize any number of databases greater than one and trends can be recorded for any period of time. Referring to FIG. 1, the data sets are housed in databases on one or more Database Servers 140a-140n. The physical machines in FIG. 1 merely represent one possible configuration for different data sets. For example, multiple databases may be hosted on a single machine. Additionally, the individual data sets may be located in the same database but differentiated, for example, in separate schemas. One of skill in the art will recognize varied configuration possibilities for these data sets.

The tracking of inquiries over the course of a greater time period lessens the impact of fads, or events only relevant due to trends at a given time. The elimination of fads is desirable because the model is then more accurate in predicting the media interest in a more "timeless" manner.

In this embodiment, media inquiries included but were not limited to those from reporters, editors, and producers at major daily news outlets, local broadcast media, national and international trade media, and weekly news outlets.

Figure 2:
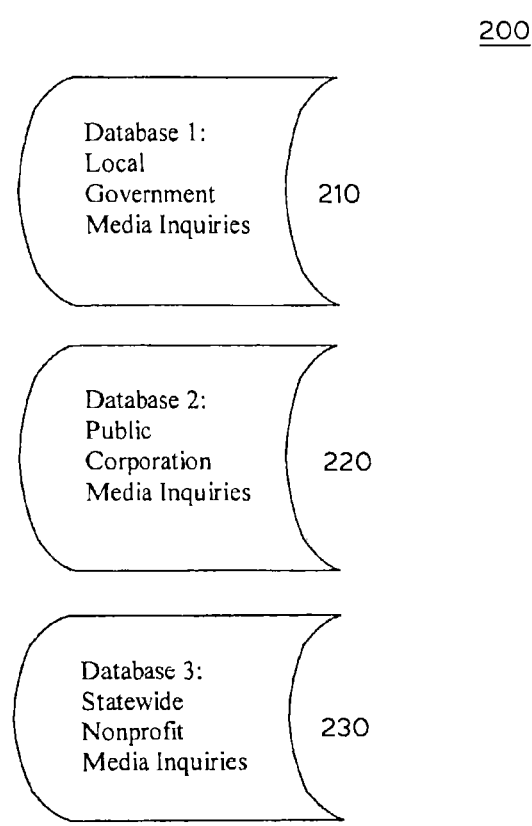
FIG. 2 depicts a database schema of an embodiment of the present invention.

Referring to FIG. 2, in an embodiment of the present invention, the three databases housing data comprising the data set 200 includes Database 1 210, inquiries to a local government entity, Database 2 220, a publicly traded, global biotechnology company, and Database 3 230, a nonprofit trade association. The diversity of the news items and media inquiries based on these news items across varied organizations generates a benchmark that accurately evaluates equally diverse potential news stories.

Based upon content analysis, which can be accomplished using a search algorithm, a query of the data, and/or any context-sensitive tool known to one of skill in the art, common factors are identified in news items. Because only those stories that received inquiries are included in the data model, factors common across these news items can be correlated with media interest. Unplanned events or "spot news" such as natural disasters, crime, accidents and the like are eliminated from the analysis since they are news items that one cannot plan for, nor are they news items that an organization would typically seek to occur or publicize.

In an embodiment of the present invention, the trends across the collected inquiry information revealed 17 different "news angles." The news angles, described in greater detail below, are as follows: localization, policy effect, seasonal or timely, trend, follow up/analysis, conflict or controversy, impact or magnitude, unique, upcoming event, visual opportunity, known or distinguished personality, investigative or insider, proximity or location, milestone, report or policy brief, financial accountability, and governance.

The LOCALIZATION news angle is found in local news stories that relate to a larger event or issue taking place on the national, state or international stage. In some cases, this category can include a tie-in to a significant local event. Examples include local tie-ins to national or statewide economic issues (unemployment, energy, budget deficits, foreign exchange rates, changes in the stock market, bonds, or commodity prices, etc.); breakthrough scientific or technological developments (new discoveries or changes in past thinking, the development of new treatments or research insights, or technologies); health or safety issues (concern over a national flu epidemic, Swine flu or the SARS virus; airline or highway safety); transportation issues; political events or current issues in Washington, D.C. or the state capital; major cultural or artistic events (the opening of a blockbuster movie, a celebrity or political wedding, etc.).

The POLICY EFFECT news angle is found in news stories that dramatize or provide specific information on the effect of a new state, federal or local law, regulatory change, court decision, government program, proposal or policy. Examples include how a proposal to make more generic drugs available would affect a pharmaceutical company, how a cap on the number of visas issued to foreign workers would affect a business dependent on workers coming from overseas; how a proposed tax cut, tax increase or tax credit would affect an individual or small business; how a new court case or decision on random drug tests in the workplace would affect school districts; or how a local proposal to close off a road could affect homeowners and businesses.

The SEASONAL OR TIMELY news angle is found in news stories that coincide with the time of year or season. These are typically annual or cyclical phenomenon that happen every year at a specific time such as holidays, graduation ceremonies, tax filing day, election day, the college admissions process, summer jobs, summer school, corporate annual meetings, Christmas bonuses, major industry events (such as a large conference or annual trade show), stories that tie-in to the four seasons and so on. Examples include news stories highlighting illness prevention efforts during flu season, telecommuting during snow days in winter, the employment outlook in an industry during college graduation season, tax preparation leading up to the April 15 tax filing deadline, an egg hunt during Easter.

The TREND news angle is found in news stories that illustrate ideas, practices, policies and things taking root in an industry, region, or society in general. A trend can fall into at least four areas: First, a trend can be related to lifestyle, such as demographic changes in the workforce, or businesses offering employees work-life balance by providing health club memberships, in-house exercise facilities, or take home meals. Second, a trend may also be related to a specific industry, such as expensing stock options, increasing globalization or outsourcing, researching job applicants online, banning cell phone cameras, increasing network security, instituting dress codes, moving to smaller high schools, etc. Third, a trend may be related to the economy such as increased hiring, shifting spending habits, changes in travel spending, or new ways of generating revenue, especially in a tight economy. Fourth, a trend may be related to a region, such as an increase in biotechnology research or an influx of immigrants in a particular area, etc.

The FOLLOW UP/ANALYSIS news angle is found in news stories in which the media follow up on previously reported stories to determine if any new developments have occurred. These types of stories take two primary forms: follow-up and "cause" or "analysis" stories. The first form, follow-up, is when a reporter returns to a previously covered story to determine if any changes or new developments have occurred, but does not have a specific story idea in mind. The second form is "cause" or "analysis" stories, in which a reporter has a specific, news angle in mind when pursuing a follow-up story. An example of this type of story is where a reporter revisits unresolved issues from previous news stories, or checks-in to see if an organization has followed through on something it publicly announced earlier, something mentioned to the reporter in conversation, or an item that was discussed at a public meeting. Follow-up stories are particularly common in the aftermath of a crisis, natural disaster or "spot" news.

The CONFLICT OR CONTROVERSY news angle is found in news stories where the element of conflict is heightened due to proactive, vocal or vehement opposition to a particular proposal, issue, event, etc. Examples include legal challenges or lawsuits, a stalemate in contract negotiations, political involvement or campaign contributions, local zoning disputes, debate over public policy issues, security or privacy concerns, angry customers or taxpayers, religious disputes, commercialization in government or nonprofits, public forums over controversial issues, internal or external dissension.

The IMPACT OR MAGNITUDE news angle is found in news stories that report on actions that affect many people, or have a significant effect on either a certain group of people or an institution. These types of stories also highlight situations where the potential effect of an action is great. Examples include any action or proposal that would result in a significant economic impact on an organization, employees, industry, geographic area, or group of people, such as consolidating or laying off employees, closing or downsizing a facility, creating jobs, relocating jobs, losing a significant contract or customer. Also included are changes that greatly affect an organization: a major change in the competitive landscape (such as a rival product or new competitor, mergers and acquisitions of customers, suppliers), injuries or threats to safety or health, or a potentially hazardous situation.

The UNIQUE news angle is found in news stories portraying circumstances, events, people, policies, or things that go against the grain or conventional wisdom. Journalists often refer to these stories as "man bites dog" because they contain an element of the unexpected. Examples include unusual work spaces (employee-friendly buildings to inspire creativity), companies prospering in a tough economy, a business joining an academic library consortium, a national "baking Olympics," an alternative prom. First-time phenomena, such as being the first organization to adopt a new policy or program of some sort, also fall into this category.

The UPCOMING EVENT news angle is found in news stories that precede an event that will occur in the near future, report on something that is expected to happen, or preview an upcoming noteworthy event or meeting. Examples include stories that run in advance of: adopting a new proposal, holding a conference or symposium, unveiling an expansion or collaboration, launching a new product, presenting research findings, speaking or presenting at a major event, and discussing or taking action on an item at an upcoming meeting of a local, state or federal government agency.

The VISUAL OPPORTUNITY news angle is found in news stories that make use of strong and engaging visuals or incorporate subject matter that is visually compelling. Such stories offer the media an opportunity to take video footage or photographs or incorporate graphics, animations, diagrams, charts, images, logos and other visual aids. Strong and engaging visuals can include photo opportunities, particularly those that show interaction among people or offer the unexpected—such as taking someone out of their normal element, as well as traditional "grip and grin" photos—such as ribbon-cuttings, check presentations, and the like. Other examples include product demonstrations and settings, such as holding an event in a location that has a strong visual connection to the subject at hand (i.e., announcing a new prescription drug program for the elderly at a pharmacy).

The KNOWN OR DISTINGUISHED PERSONALITY news angle is found in news stories featuring individuals who are well known or prominent in their field such as public officials (at all levels—federal, state and local), especially elected officials. This category can also include individuals who are either well-known in the local community, or prominent within their particular field, including the CEO and senior executives of an organization. These can take the form of personality stories, "movers and shakers," stories focusing on an "expert" in something, as well as celebrities (national or local).

The INVESTIGATIVE OR INSIDER news angle is found in news stories that are often longer and take more time to research and report—weeks or even months compared to a few days. Stories in this category include those that seek to uncover wrongdoing, misuse of funds, waste, fraud or abuse, as well as those that take one inside a process or decision. Examples include: in-depth stories, case studies, analysis of a business sector, a company profile, process or "how to" stories such as how to craft benefit plans, inside the college admissions process, or a look inside a startup company.

The PROXIMITY OR LOCATION news angle is found in stories that have a strong connection to a specific geographic area, as measured by the presence of one or more of the following criteria: the item depicted in the story occurs in that specific area, involves someone or something from that area, or affects someone or something in that area. Examples include the growth of a business sector (e.g., technology, nonprofit, biotechnology) in a region; the marketing or branding of a region, or local economic outlook; stories describing what a region has meant to an organization in terms of access to capital or government funding, ability to recruit employees, access to global transportation lines, etc.

The MILESTONE news angle is found in news stories highlighting an anniversary, milestone or award. An anniversary or milestone can be something related to an organization, product or person; a major law or policy; or an historical, social or cultural event. A milestone event can be the retirement of a key executive, an initial public offering, or the achievement of a major benchmark. Anniversary and milestone stories can also call attention to obstacles that prevent someone from achieving his or her full potential. An award can be an honor given to an individual or organization, as well as a national ranking or appearance on a national list.

The REPORT OR POLICY BRIEF news angle is found in news stories that cover a widely released report containing data, analysis, predictions, forecasts, or recommendations, such as those aimed at a geographic region, industry, policy or budget issue, or organization. Examples include reports on the economy and business climate (consumer spending, monthly unemployment data, job growth predictions, etc.), public policy issues (health care reform, etc.), demographics (census data, etc.), and stock analyst reports on a company or industry (an upgrade or downgrade, industry study, etc.). Reports can also incorporate a more "soft news" component by weighing in on more popular topics, such as "best" or "worst" lists.

The FINANCIAL ACCOUNTABILITY news angle is found in news stories that deal with the financial status or health of an organization, especially if the organization receives taxpayer-funding, is publicly traded, is a major employer in its region, or prominent in its industry. Financial accountability includes: executive compensation, release of earnings or financial statements, significant changes in an organization's financial status such as those that can occur due to donations, grants, or movement in stock price, etc.

The GOVERNANCE news angle is found in news stories chronicling changes at the top of an organization; specifically, changes in three categories: ownership, governance and management. Changes in ownership or governance of an organization include situations where one organization is taking ownership or control of another, changes to an organization's board of directors, hiring a new executive, promoting an existing executive, or the departure of an executive, and management restructurings.

The news angles are weighted in accordance with their frequency in each database, in this embodiment, in each of three databases. Each news angle is assigned to a "tier." A news angle in a higher tier has greater impact on the News Value Score than a news angle in a lower tier. To determine which tier a news angle should be assigned to, in each database, the median frequency for each news angle is calculated. Each news angle is given a base value of "1." For each time the frequency of the news angle exceeds the median frequency in a given database, this score is incremented by one. Thus, a news angle that exceeds the median frequency in all three of the databases, will be assigned to Tier 4 (1+1+1+1=4). A news angle that exceeds the median in only one database, will be assigned to Tier 1 (1+1+0+0=2).

Each news angle is assigned to one of four possible tiers based on the number of times the frequency of that news angle appears at or above the median frequency in each data set. In the conditional statements below, M refers to the Median frequency in each dataset, T refers to Tier Assignment, F refers to the Frequency of each news angle, NA refers to the individual News Angles and $db_{1-3}$ refers to the respective databases of actual media inquires. For each news angle:

$$F[NA_i \text{ where } i=1\text{-}17] \geq Mdb_1 \wedge Mdb_2 \wedge Mdb_3 \rightarrow T = \text{"4"}$$

$$F[NA_i \text{ where } i=1\text{-}17] \geq Mdb_1 \wedge Mdb_2 \neg Mdb_3 \rightarrow T = \text{"3"}$$

$$F[NA_i \text{ where } i=1\text{-}17] \geq Mdb_1 \wedge Mdb_3 \neg Mdb_2 \rightarrow T = \text{"3"}$$

$$F[NA_i \text{ where } i=1\text{-}17] \geq Mdb_2 \wedge Mdb_3 \neg Mdb_1 \rightarrow T = \text{"3"}$$

$$F[NA_i \text{ where } i=1\text{-}17] \geq Mdb_1 \neg Mdb_2 \neg Mdb_3 \rightarrow T = \text{"2"}$$

$$F[NA_i \text{ where } i=1\text{-}17] \geq Mdb_2 \neg Mdb_1 \neg Mdb_3 \rightarrow T = \text{"2"}$$

$$F[NA_i \text{ where } i=1\text{-}17] \geq Mdb_3 \neg Mdb_1 \neg Mdb_2 \rightarrow T = \text{"2"}$$

$$F[NA_i \text{ where } i=1\text{-}17] < Mdb_1 \wedge Mdb_2 \wedge Mdb_3 \rightarrow T = \text{"1"}$$

Figure 3:
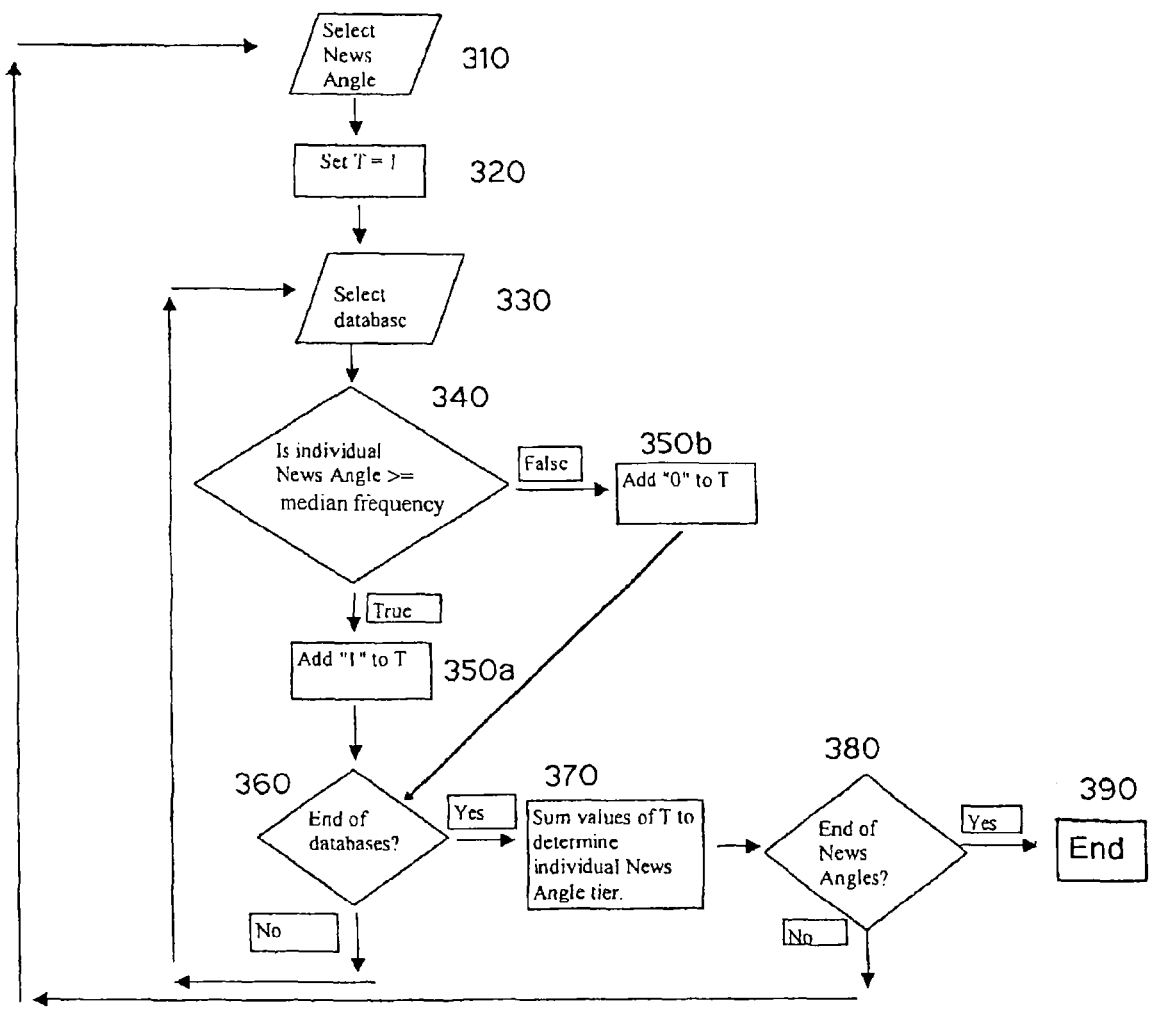
FIG. 3 depicts a workflow of an embodiment of the present invention.

FIG. 3 depicts the workflow 300 of assigning each news angle to a tier in an embodiment of the present invention. First, a news angle is selected 310 from those identified. Next, "T" which represents tier is set to a value of 1 320. This is the base value and if it is not incremented through the remainder of the workflow, the news angle will be assigned to Tier 1, the lowest tier. Then, a first database is selected 330 from the set of available databases. In the selected database, the frequency of this news angle is quantified to see if it exceeds the median frequency 340. If it does, T is incremented by 1 350*a*. If it does not, T is not incremented 350*b*. Next, the process checks if there are any additional databases 360. If there are more databases, for the same news angle, the next database is selected 330 and steps are repeated to increment T as appropriate. If there are no more databases, the value of T is final 370. Then, the process checks if there is another news angle or if the final news angle was evaluated 380. If the final news angle was evaluated, the process ends 390. If news angles remain, the next news angle is selected 310 and the process resumes.

News angles are weighted based upon their tier assignment to provide greater emphasis on the score of those news angles that consistently appeared most frequently in the databases, using the equations: $WNA_i = T_i * W_i$, and $W = 100/\Sigma T_i$, (i=1-17), where WNA refers to the weighted news angle, T refers to the Tier Assignment, and W refers to the base news angle weighting. If a news angle with a higher weight is present in a potential news story, more points are awarded when scoring this story.

Figure 4:
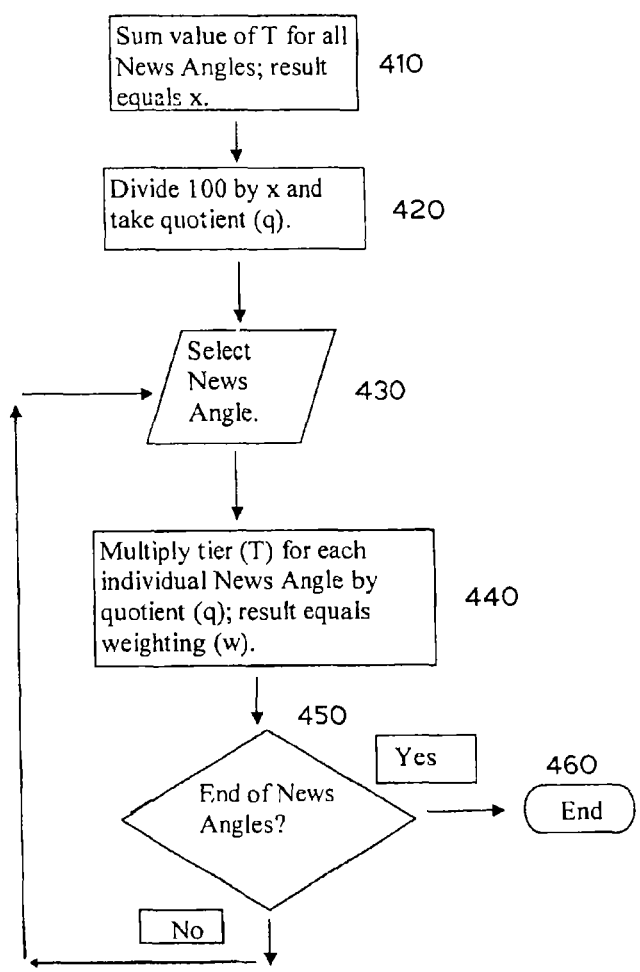
FIG. 4 depicts a workflow of an embodiment of the present invention.

Although a specific formula for determining weighting is defined by this formula, one of skill in the art will recognize that the weighting is relational. The news angles that exceed the median frequency, i.e., those that are determined to be more likely to attract media attention, are assigned a higher value in a manner that will impact the final score of a contemplated story. In the embodiment of FIG. 4, the calculations assign a multiplier that is effective when the News Value Score sought is a percentage based on a 100 point scale. There are many differing approaches to this calculation and provided that the relationship of the news angles to each other and their respective impacts on the final score are maintained, the equation itself can be varied.

FIG. 4 depicts the workflow 400 of the process for determining the weighting of news angles in an embodiment of the present invention. The final T value, the tier, of each news angle is added together and this result is represented by the variable "x" 410. This x is then divided by 100 to determine a quotient, represented by "q" 420. Once "q" is derived, a news angle is selected 430. The T for this news angle is multiplied by q and the product, is the weighting for the news angle 440. The weighting is represented by the variable "w." Then there is a check for remaining news angles 450. If news angles remain, a news angle is selected 430 and the process continues. When no news angles remain, the process is complete and a "w" value, a weight, for each news angle has been determined 460.

The equations for calculating the News Value Score take the forms below, where WNA refers to weighted news angles, b refers to unstandardized B coefficients with values greater than 0.02, $\alpha$<0.05 in a statistically significant multiple linear regression equation; $R^2$ refers to the coefficient of determination in a multiple linear regression equation; $M_1$ equals a weighting factor; T refers to the Tier ranking for a news angle, and W equals the initial base weighting for each news angle:

$$\sum_{i=1}^{n} \{WNA_i + [(WNA_i)*(R^2*b)]\}*M_1$$

$$WNA_i = T_i * W_i, (i = 1 - n)$$

$$W_i = \left(100 \Big/ \sum_{i=1}^{n} T_i\right)$$

Once the multipliers have been added, the formula for rescaling the base weighting for news angles takes the form below, where T equals the Tiers for each news angle, B equals the final value for each of the multipliers, and x is the new value of the base weighting for each news angle:

$$\left(\sum_{i=1}^{n} T_i + \sum_{i=1}^{n} B_i\right)*x = 100$$

Relevance criteria, the presence of which determines the Relevance Score, are based upon correlating the sources of past media inquiries, meaning what actions, events, people, institutions, organizations, announcements, information or reports prompted the inquiry or story. Based upon content analysis of one or more databases of past inquiry data, an analysis which can be accomplished using a search algorithm, a query of the data, and/or any context-sensitive tool known to one of skill in the art, common source patterns are identified.

In an embodiment of the present invention, the trends across the collected inquiry information revealed 10 different "relevance criteria." The relevance criteria, described in great detail below, are as follows: public official's comment, previous news story, national events, proactive outreach, annual, action by industry peer, action by other organization, government action, enterprise, and public filing.

The PUBLIC OFFICIAL'S COMMENTS relevance criterion includes comments made by elected or appointed leaders that result in news coverage.

The PREVIOUS NEWS STORY relevance criterion refers to an existing story that has been covered by the local news media.

The NATIONAL EVENTS relevance criterion refers to stories emanating from larger national, international, state or regional events.

The PROACTIVE OUTREACH relevance criterion includes stories resulting from proactive actions taken by an organization purposely seeking publicity, news coverage, or greater awareness such as issuing a news release, discussing a story with a journalist, or placing an advertisement.

The ANNUAL relevance criterion refers to a story whose source derives from something seasonal, or is based on something that occurs annually at a specific time of year.

The ACTION BY INDUSTRY PEER relevance criterion includes stories derived from an action or event by others in the same industry.

The ACTION BY OTHER ORGANIZATION relevance criterion refers to an announcement, news release, report, prediction or pitch from another, external organization outside of one's industry.

The GOVERNMENT ACTION relevance criterion includes stories emanating from a federal, state or local action, proposal, program implementation or decision.

The ENTERPRISE relevance criterion refers to stories based on an editor, producer or reporter's idea, with no other context, often based on a journalist's familiarity with an individual or organization, enterprising research into a topic, or cold calling on a "slow" news day to determine if anything newsworthy is happening.

The PUBLIC FILING relevance criterion includes stories based on the filing or disclosure of information, often through notice of a public meeting, document filing or legal notice with a state, federal or local municipality, such as forms filed with the Securities and Exchange Commission, court systems, local planning boards, town boards, boards of education, including documents and information provided to organizations subject to Freedom of Information Laws, and information available on the Internet.

As with the news angle databases, the median frequency is used to place relevancy criteria into tiers in order to reduce the effect of outliers in the datasets. A median value is determined across the data set in each database for all relevance criteria. Then, each individual criterion is assigned to tiers based upon the number of times that criterion appeared at or above the median frequency in each database.

In an embodiment of the present invention, using two databases, each relevance criterion is assigned to one of three possible tiers based on the number of times that criterion appeared at or above the median frequency in each data set. Assignment is accomplished using the following series of conditional statements, where M refers to the Median frequency in each dataset, T refers to Tier Assignment for the relevance criteria, F refers to the Frequency of each relevancy criteria, Re refers to the relevancy criteria, and $db_1$ and $db_2$ refer to the respective databases of actual media inquiries:

$F[Re_i \text{ where } i=1\text{-}10] \geq Mdb_i \wedge Mdb_2 \rightarrow T=\text{"3"}$ $F[Re_i \text{ where } i=1\text{-}10] \geq Mdb_i \neg Mdb_2 \rightarrow T=\text{"2"}$ $F[Re_i \text{ where } i=1\text{-}10] \geq Mdb_2 \neg Mdb_1 \rightarrow T=\text{"2"}$ $F[Re_i \text{ where } i=1\text{-}10] < Mdb_i \wedge Mdb_2 \rightarrow T=\text{"1"}$ In the two database embodiment, tier 3 includes relevance criteria whose frequency scores appear above the median frequency in both database 1 and database 2. Criteria in this tier represent the most frequently occurring criteria across the two datasets and rank the highest in Relevance.

Figure 5:
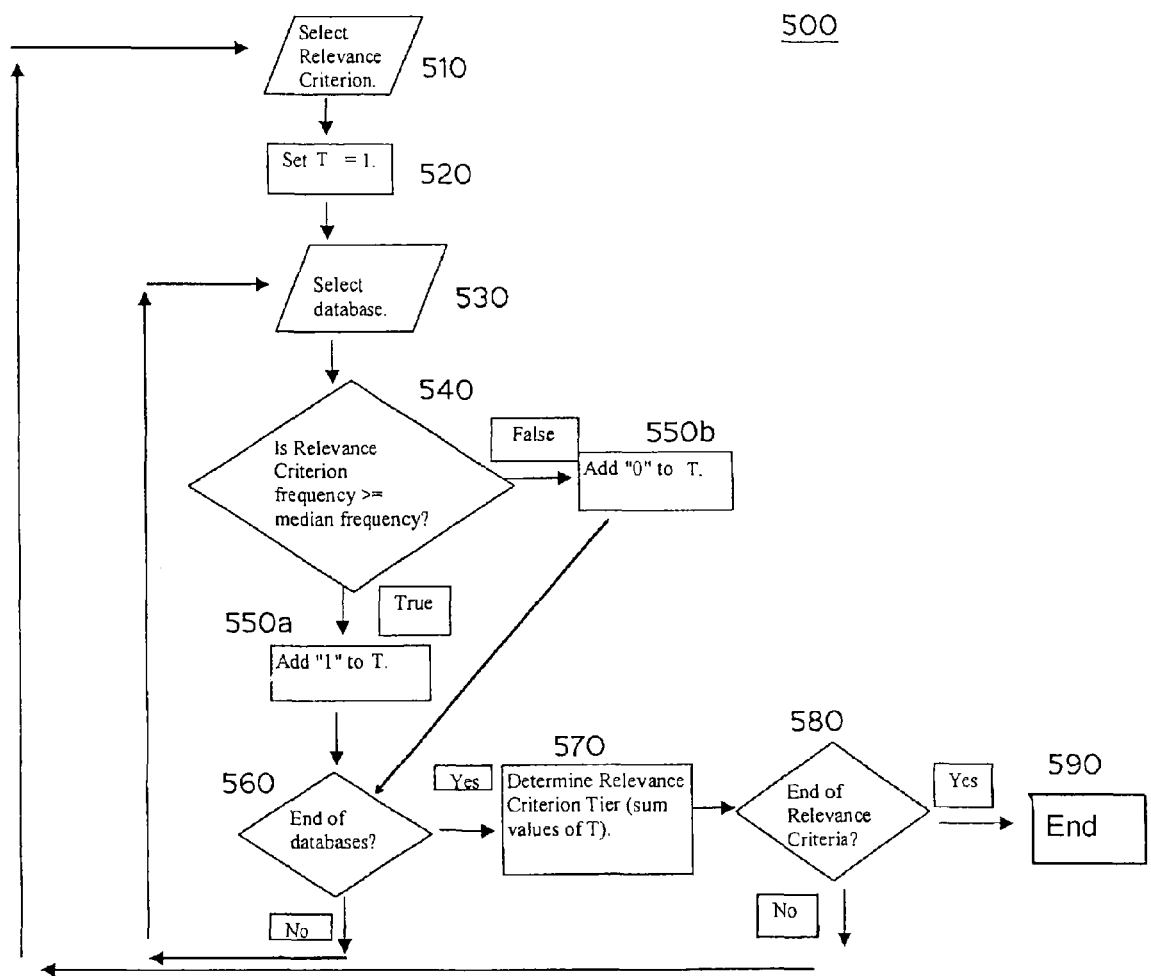
FIG. 5 depicts a workflow of an embodiment of the present invention.

Referring to FIG. 5, a workflow 500 for assigning relevance criteria to tiers for an embodiment of the present invention is depicted. First, a relevance criterion is selected 510 from those identified. Next, "T" which represents the tier is set to a value of 1 520. This is the base value and if it is not incremented through the remainder of the workflow, the relevance criterion will be assigned to Tier 1, the lowest tier. Then, a first database is selected 530 from the set of available databases. In the selected database, the frequency of this relevance criterion is quantified to see if it exceeds the median frequency 540. If it does, T is incremented by 1 550*a*. If it does not, T is not incremented 550*b*. Next, the process checks if there are any additional databases 560. If there are more databases, for the same relevance criterion, the next database is selected 530 and steps are repeated to increment T as appropriate. If there are no more databases, the value of T is final 570. Then, the process checks if there is another relevance criterion or if the end of the final relevance criterion was evaluated 580. If the final relevance criterion was evaluated, the process ends 590. If relevance criteria remain, the next relevance criterion is selected 510 and the process resumes.

Weightings for each of the relevance criteria are calculated in order to provide greater emphasis on criteria that consistently appear most frequently in the databases, using the equations: $WRe_i = T_i^*$ and $W = 100/\Sigma T_i$, (i=1–10), where W refers to the base relevance weighting, T refers to Tier Assignment, and WRe refers to the weighted relevance criteria.

Figure 6:
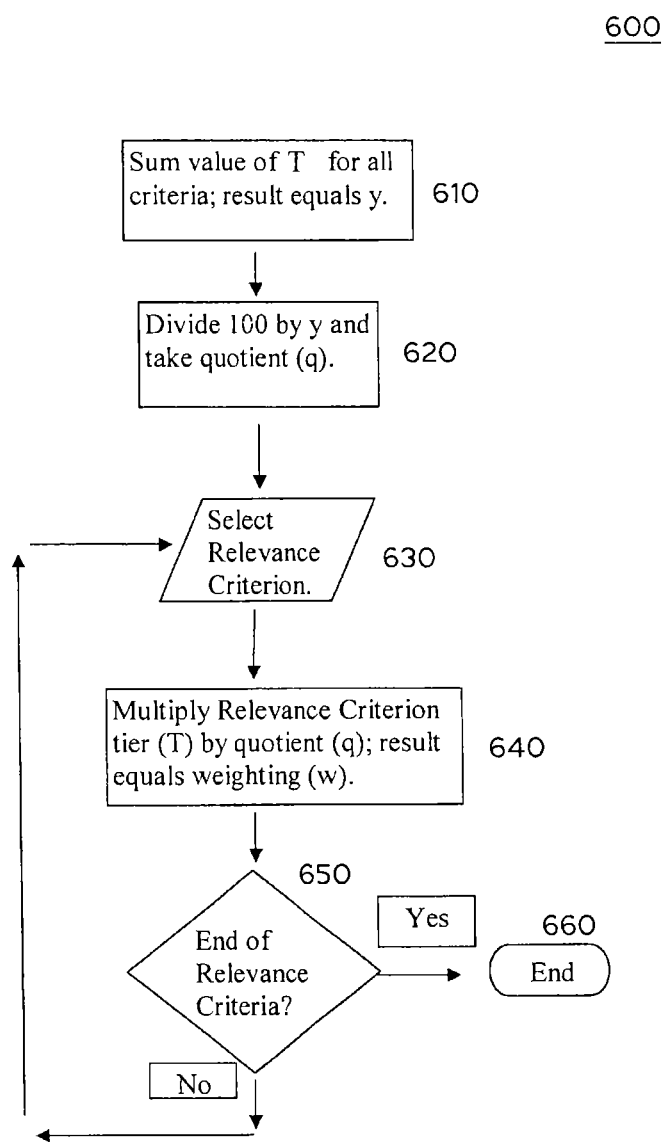
FIG. 6 depicts a workflow of an embodiment of the present invention.

Although a specific formula for determining weighting is defined by this formula, one of skill in the art will recognize that the weighting is relational. The relevance criteria that exceed the median frequency, i.e., those that are determined to be more likely to attract media attention, are assigned a higher value in a manner that will impact the final score of a contemplated story. In the embodiment of FIG. 6, the calculations assign a multiplier that is effective when the Relevance Score sought is a percentage based on a 100 point scale. There are many differing approaches to this calculation and provided that the relationship of the relevance criteria to each other and their respective impacts on the final score are maintained, the equation itself can be varied.

FIG. 6 depicts the workflow 600 of the process for determining the weighting of relevance criteria in an embodiment of the present invention. The final T value, the tier, of each relevance criterion is added together and this result is represented by the variable "y" 610. This y is then divided by 100 to determine a quotient, represented by "q" 620. Once "q" is derived, a relevance criterion is selected 630. The T for this relevance criterion is multiplied by q and the product, is the weighting for the relevance criterion 640. The weighting is represented by the variable "w." Then there is a check for remaining relevance criteria 650. If relevance criteria remain, a new relevance criterion is selected 630 and the process continues. When no relevance criteria remain, the process is complete as a "w" value, a weight, for each relevance criterion has been determined 660.

Figure 7:
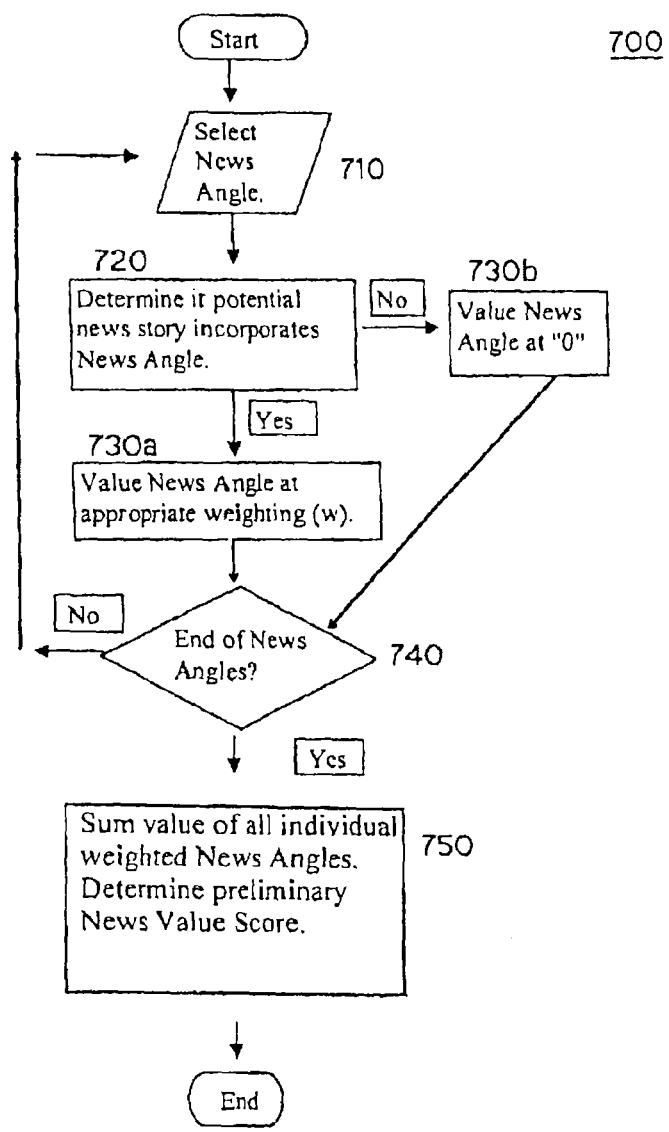
FIG. 7 depicts a workflow of an embodiment of the present invention.

After the weighting for both News Value and Relevance scoring is determined, a contemplated news story can be scored, i.e., a user can use an embodiment of the present invention to evaluate whether the potential news story will receive media attention. FIG. 7 depicts the workflow 700 of the calculation of a News Value Score for a contemplated story using the factors and weighting derived from a data set.

Referring to FIG. 7, a given news angle is selected 710. Using any context-sensitive querying tool, including but not limited to soliciting a response to a true/false question and/or yes/no question, the news story is evaluated for the presence of a news angle 720. If the story does not contain the news angle, no score is added 730*b* and the process continues with another news angle, should there be any remaining news angles 740. If the story contains the news angle, the properly weighted score for that news angle is added to the News Value Score 730*a*. Then, if there are remaining news angles, the evaluation continues. If there are no remaining news angles, the individual news angles are added together to determine the preliminary News Value score 750 before any multipliers are added.

Figure 8:
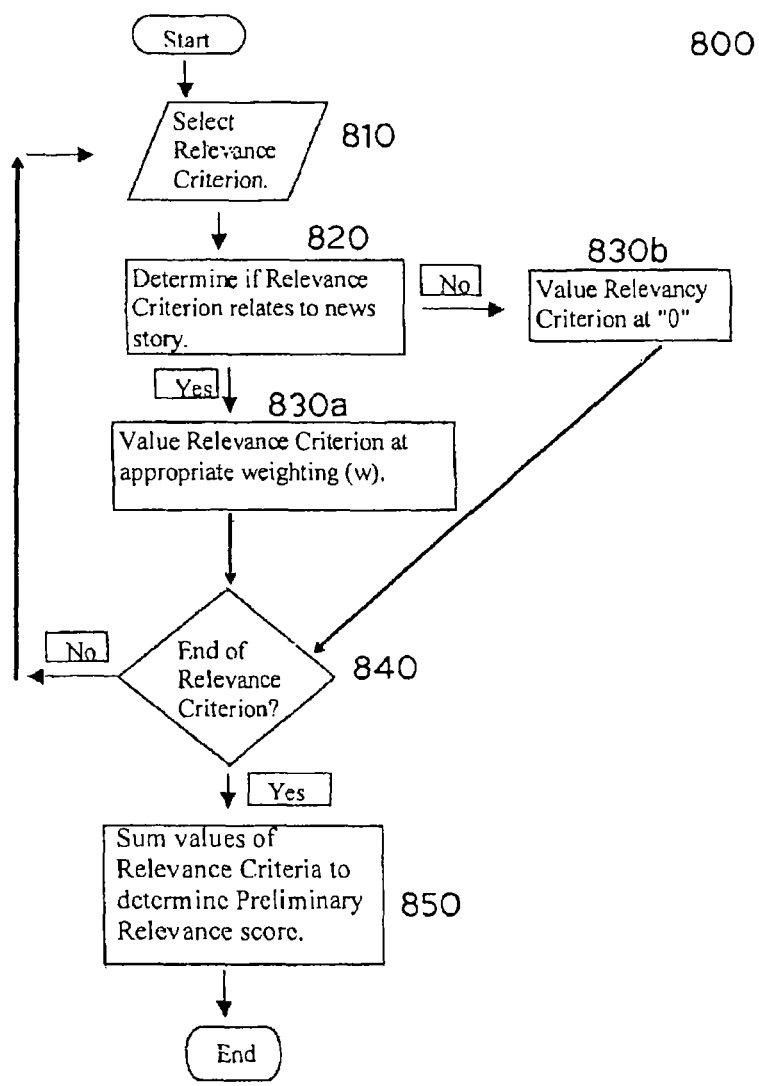
FIG. 8 depicts a workflow of an embodiment of the present invention.

The Relevance Score is determined in a similar fashion in this embodiment of the present invention. Referring to FIG. 8, a relevance criterion is selected 810. Then, using any context-sensitive querying tool, including but not limited to soliciting a response to a true/false or yes/no question, the news story is evaluated for whether it relates to a given relevance criterion 820. If the story is related to the relevance criterion, the properly weighted score for that relevance criterion is added to the Relevance Score 830*a*. Then, if there are remaining relevance criteria, the evaluation continues. If there are no remaining relevance criteria, the individual relevance criteria are added together to determine the preliminary Relevance Score, the final score 850 before any multipliers or divisors are included.

In the calculation of these two scores, news angles and relevance criteria belonging to higher ranked tiers generate greater weight in the scores than those belonging to lower ranked tiers. For example, in an embodiment of the present invention, the governance news angle may be worth 7 points, out of the 100 total points and the unique news angle may be worth 18 points. Thus, a contemplated story with only a unique angle will have a higher News Value Score than a contemplated story with only a governance angle.

An embodiment of the present invention, takes into account responses provided by the user and adjusts the newsworthiness value accordingly. The invention uses unstandardized B coefficients greater than 0.02 where $\alpha<0.05$ and overall $R^2$ values from a series of statistically significant multiple linear regression analyses as multipliers to provide additional weightings to news angles and relevance criteria.

The overall newsworthiness of a potential story increases by identifying consistent news angle-relevance patterns. In one application of the invention, responses are solicited to statistically related statements, and because of the correlation, the score is increased. In the case of two statistically related statements or story-source combinations, the newsworthiness of the story is increased by the value of $[(WNA_i)^*(R^2 {}^* b_{1)} \ldots]$ or $[(WRe_i)^*(R^2 {}^* b_1 \ldots)]$, depending on whether the multipliers $b_1$, $b_2$, etc. are used in the calculation of News Value or Relevance, and where WNA refers to the weighted news angle and WRe refers to the weighted relevance criterion. The value of the multipliers themselves are determined by taking the product of each individual unstandardized B coefficient (referred to in the formula above as $b_1$, $b_2$ ... ) and the overall $R^2$, the coefficient of determination, from a statistically significant multiple linear regression equation.

Figure 9:
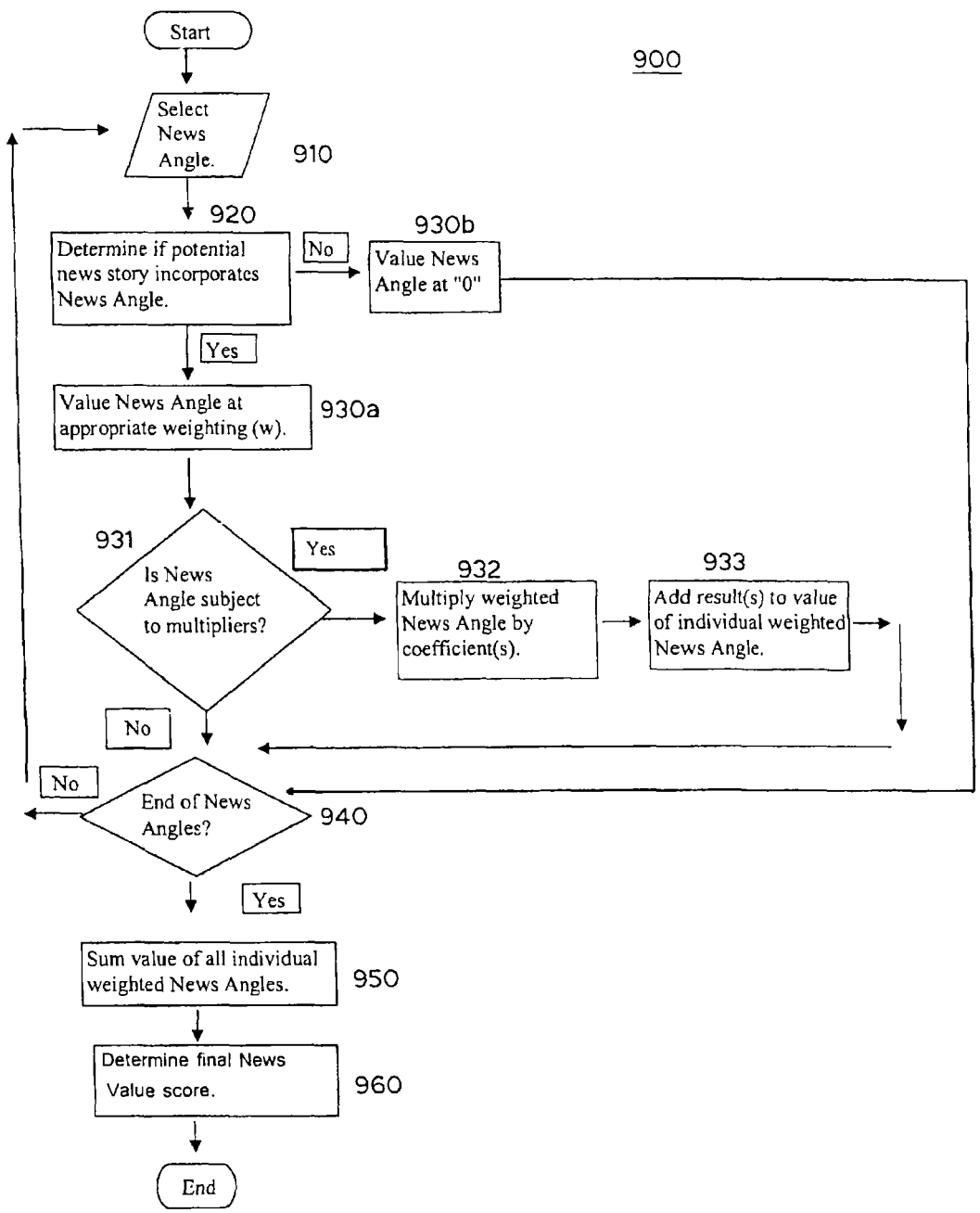
FIG. 9 depicts a workflow of an embodiment of the present invention.

FIG. 9 depicts a workflow 900 of an embodiment of the present invention when multipliers are taken into account in the final News Value Score. The workflow 900 is similar to that of the workflow 700, with the addition of multipliers, which add "bonus" points to the score. Because of a correlation in information, the story is predicted to generate a greater impact than each factor alone or the sum of these factors together. In this workflow 900, the system and method evaluates whether a given news angle is subject to multipliers 931. If the news angle is subject to multipliers, the weighted news angle score value (WNA, where WNA=T*W) is multiplied by the coefficient(s) $(R^2 {}^* b_i)$ 932 and the results are added to the score 933.

Figure 10:
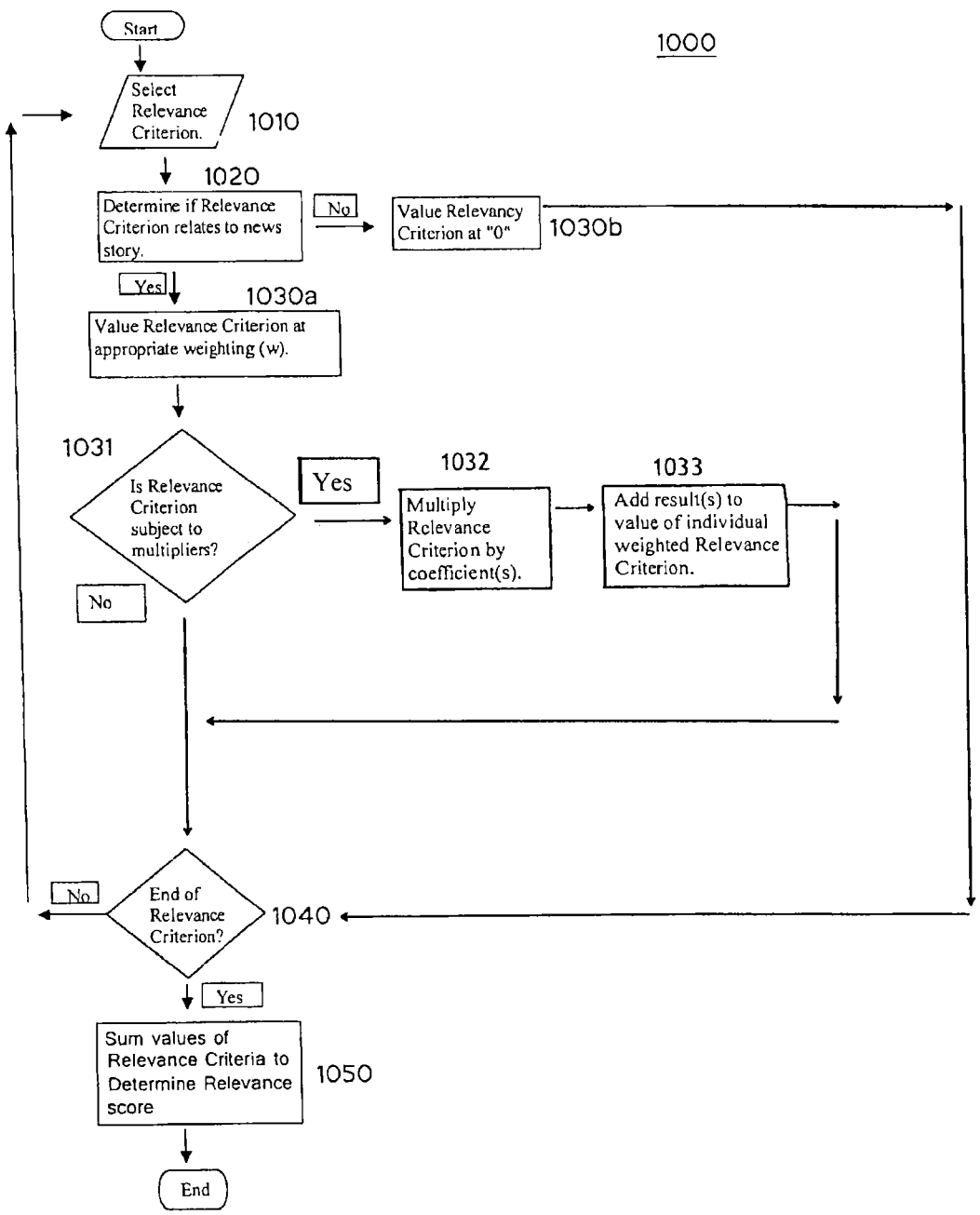
FIG. 10 depicts a workflow of an embodiment of the present invention.

In a manner similar to the News Value Score, the Relevance Score may also receive "bonus" points in certain embodiments of the present invention. Referring to FIG. 10, steps are added in the workflow 1000 to account for the addition of multipliers to the Relevance Score. Once a relevance criterion is selected 1010, a determination is made that the relevance criterion relates to the contemplated news story 1020, and the weight is assigned 1030a, whether the relevance criterion is subject to multipliers is then evaluated 1031. If multipliers are applicable, the score is incremented 1032.

The Relevance (and ultimately the newsworthiness) of a potential story increases when the user identifies statistically related story-source (i.e., news angle-relevance) patterns. In an embodiment of the present invention, the invention uses $R^2$ values and unstandardized B coefficients greater than 0.02 where $\alpha<0.05$ from a series of multiple linear regression analyses as multipliers to provide additional weighting to relevance criteria.

In an embodiment of the present invention, if two statistically related news angles and/or relevance criteria appear in the same story, the overall Relevance of the story is increased by the value of $[(WRe_i)*(R^2*b_1) \ldots ]$, where WRe refers to the weighted individual relevance criterion, $R^2$ represents the coefficient of determination and $b_1$, $b_2$, etc. represent unstandardized B coefficients from a statistically significant multiple linear regression equation.

The value of the multipliers themselves are determined by taking the product of each individual unstandardized B coefficient and $R^2$, the coefficient of determination, from a statistically significant multiple linear regression equation.

In many situations, one of the best ways to get news coverage is to piggyback on something that is already happening. Many of the relevancy criteria for gaining news coverage have to do with tying a story to an existing story already in the news. However, news often—though not always—has a short shelf life. Some news stories, such as a presidential election or wars, can carry on for months or even years, while episodic events such as tornadoes and fires have a shorter news trajectory, often measured in days. Generally speaking, though, most news stories follow a similar pattern—that is, a period of heightened or even intense media coverage, followed by a rapid, exponential decline.

To determine the rate of decline for a news story and whether one is still in the window of opportunity to piggyback on a topic already in the news, an embodiment of the present invention makes use of a news cycle sensitivity measure represented by the expression $X^2$, where X equals the number of days or weeks since a news trigger event first occurred or an initial news story first appeared, beginning with 1. That trigger event or story begins the news cycle and subsequent decline trajectory for that particular story. The news cycle sensitivity value serves as a divisor for the sum of individual weighted relevance criteria plus B coefficient multipliers.

In an embodiment of the present invention, the News Cycle Sensitivity Divisor is applied to decrease the Relevance value of an existing national or state story, depending on what stage of the news cycle the story is in at the time. For most major national news stories, media coverage will continue for several days and then decline as another major story emerges. The value of the News Cycle Sensitivity Divisor coincides with how long the story has been in the news, and can be set for days or weeks. In other words, set X=1 if an individual is attempting to piggyback on a story during the first day (or week) of coverage, X=2 on the second day (or week) of coverage, X=3 on the third day (or week), etc. The divisor reduces the Relevance Score by reducing the value of individual relevance criterion that comprise the score. More specifically, the divisor reduces the value of a specific relevance criterion and its multipliers.

In this embodiment, the divisor for news cycle sensitivity is based on the Pew Research Center's Project for Excellence in Journalism News Coverage Index, which contains a content analysis of the top stories as measured by percent of "newshole" (the amount of coverage devoted to each story) on a weekly basis in 52 mainstream news media outlets, encompassing print, television (both network and cable), radio and Internet. See http://www.journalism.org/about_news_index/overview. A review of several of 21 of the top stories that appeared during the time period Dec. 31, 2006 through May 4, 2007 shows that the average decline for news stories that exhibit downward trends is 79 percent in the second week of coverage, followed by a 34 percent decline in the third week. Thus, the value of a tier 2 relevance criterion, where the base tier weighting equals 5.0 with no coefficients as multipliers in the second week of news coverage (where X=2; $\therefore X^{2=4}$) would be reduced from 10.0 to 2.5, a value of 75 percent that approximates this rate of decline.

Figure 11:
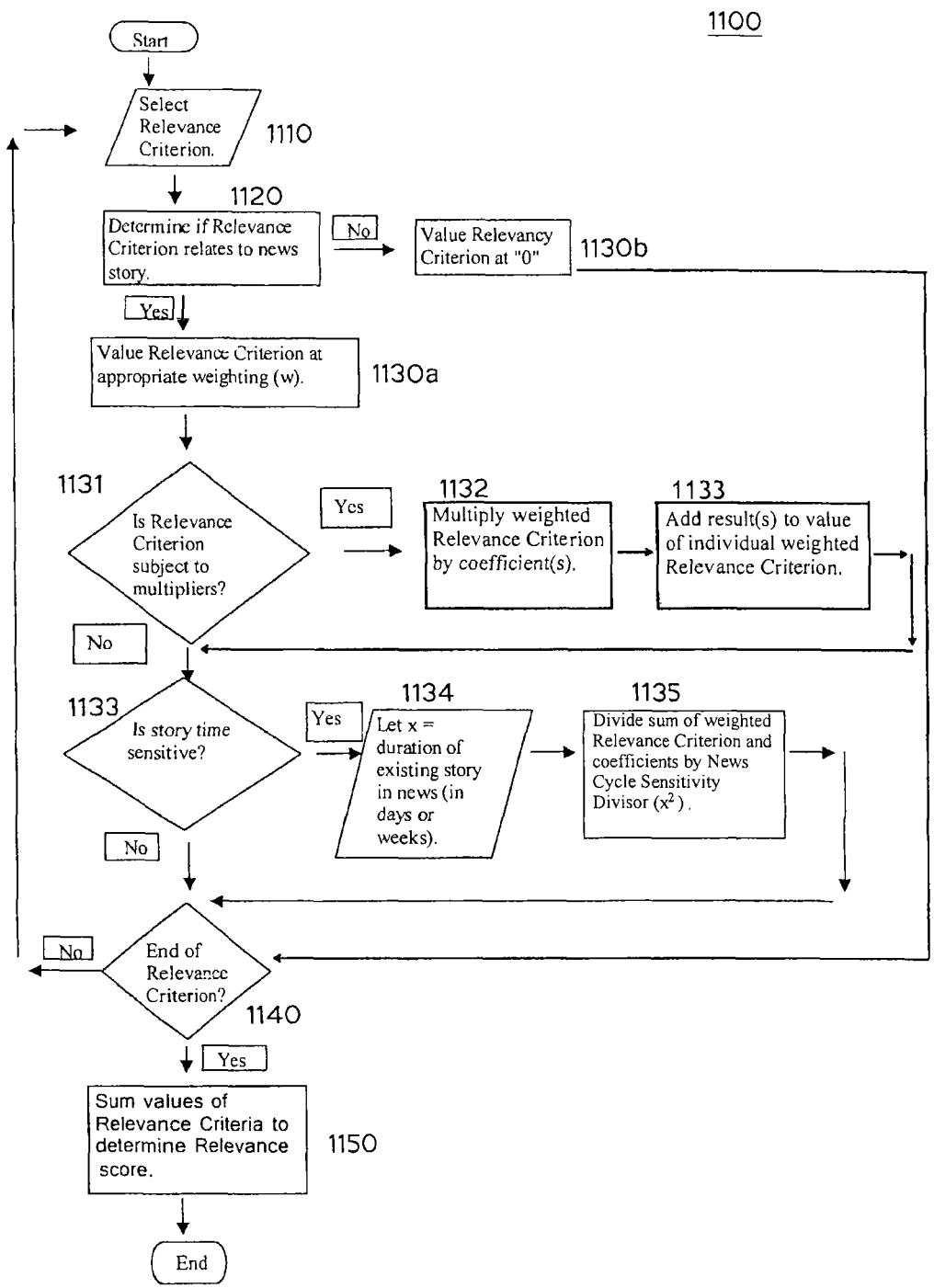
FIG. 11 depicts a workflow of an embodiment of the present invention.

FIG. 11 depicts a workflow 1100 of an embodiment of the present invention that takes into account both a multiplier and the time-sensitivity of the contemplated news story when assigning a Relevance Score. After the need for multipliers is assessed 1131 and multipliers are added as applicable 1132, the particular relevance criterion is evaluated for whether it is time sensitive 1133. A variable "x" represents the duration of an existing related story in the news 1134. For each individual relevance criterion, the sum of the weighted relevance criteria and coefficients is divided by the News Cycle Sensitivity Divisor, if applicable, in this embodiment, x squared 1135.

The equations for calculating the News Value Score take the forms below, where WNA refers to weighted news angles, b refers to unstandardized B coefficients in a statistically significant multiple linear regression equation with values greater than 0.02, $\alpha<0.05$; $R^2$ refers to the coefficient of determination in a multiple linear regression equation; $M_1$ equals a weighting factor; T refers to the Tier ranking for a news angle, and W equals the initial base weighting for each news angle.

The factor "$M_1$" in the formula for determining the overall proportion of the News Value Score in Newsworthiness represents the percent value, expressed as a decimal, assigned to the concept of News Value in the overall calculation of a potential story's newsworthiness.

$$\sum_{i=1}^{n} \{WNA_i + [(WNA_i)*(R^2*b)]\}*M_1$$

$$WNA_i = T_i * W_i, (i = 1 - n)$$

$$W_i = \left(100 \bigg/ \sum_{i=1}^{n} T_i\right)$$

Once the multipliers have been added, the formula for rescaling the base weighting for news angles takes the form below, where T equals the Tiers for each news angle, B equals the final value for each of the multipliers, and x is the new value of the base weighting for each news angle:

$$\left(\sum_{i=1}^{n} T_i + \sum_{i=1}^{n} B_i\right) * x = 100$$

The equations for calculating overall Relevance take the forms below, where WRe equals the weighted individual relevance criterion, $b_1$, $b_2$, $b_3$ . . . refer to unstandardized coefficients from a multiple linear regression equation, $R^2$ refers to the coefficient of determination in a multiple linear regression equation, X refers to the News Cycle Sensitivity Divisor, which is equal to the number of days or weeks that a pre-existing story has been in the news, T equals the tier for each of the relevance criteria, and W equals the appropriate weighting for each relevance criterion.

The factor "$M_2$" in the formula for determining the overall proportion of the Relevance Score in Newsworthiness represents the percent value, expressed as a decimal, assigned to the concept of Relevance in the overall calculation of a potential story's newsworthiness.

$$\sum_{i=1}^{n} \{(WRe_i) + [(WRe_i)*(R^2*b_1)]/X_i^2 + [$$

$$(WRe_i)*(R^2*b_2)]/X_i^2 + [(WRe_i)*(R^2*b_3)]/X^2 ...\} * M_2$$

$$WRe_i = T_i * W_i$$

$$W_i = \left(100 \bigg/ \sum_{i=1}^{n} T_i\right)$$

Once the multipliers have been added, the formula for rescaling the base weighting for each individual relevance criterion takes the form below, where T equals the Tiers for each relevance criterion, B equals multipliers and x is the new value of the base weighting for the relevance criterion:

$$\left(\sum_{i=1}^{n} T + \sum_{i=1}^{n} B\right) * x = 100$$

Together, the sum of the weighted value of all news angles and related coefficients, plus the sum of the weighted value of all relevance criteria, related coefficients and News Cycle Sensitivity Divisors, yields the overall Newsworthiness value. The factors $M_1$ and $M_2$ are applied to news angles and relevance criteria, respectively, in order to weight each of these concepts in the final formula. For example, $M_2$ could be assigned a value of 0.5, meaning that the sum of all weighted relevance criteria, related coefficients and News Cycle Sensitivity Divisors would be multiplied by 0.5 and would then account for one-half the value of the overall Newsworthiness score.

The embodiments of FIG. 1 contains terminal 110 and servers 130, and 140a-140n. These enumerated resources are all individually computer systems 1200, as illustrated in FIG. 12.

Figure 12:
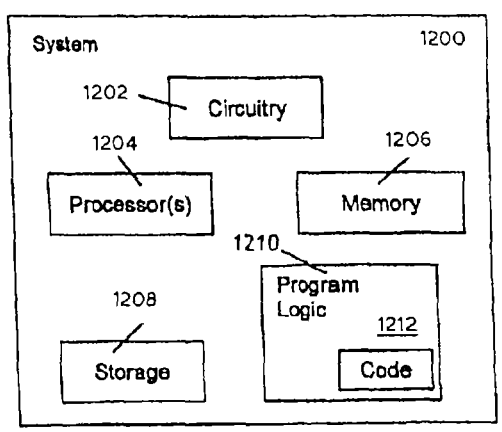
FIG. 12 depicts an embodiment of a computer system in incorporating one or more aspects of the present invention.

FIG. 12 illustrates a block diagram of a computer system 1200 which is part of the technical architecture of certain embodiments of the present invention. The system 1200 may include a circuitry 1202 that may in certain embodiments include a microprocessor 1204. The computer system 1200 may also include a memory 1206 (e.g., a volatile memory device), and storage 1208. The storage 1208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the microprocessor 1204 or circuitry 1202.

In certain embodiments, the program logic 1210 including code 1212 may be stored in the storage 1208. In certain other embodiments, the program logic 1210 may be implemented in the circuitry 1202. Therefore, while FIG. 12 shows the program logic 1210 separately from the other elements, the program logic 1210 may be implemented in the memory 1206 and/or the circuitry 1202.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 13:
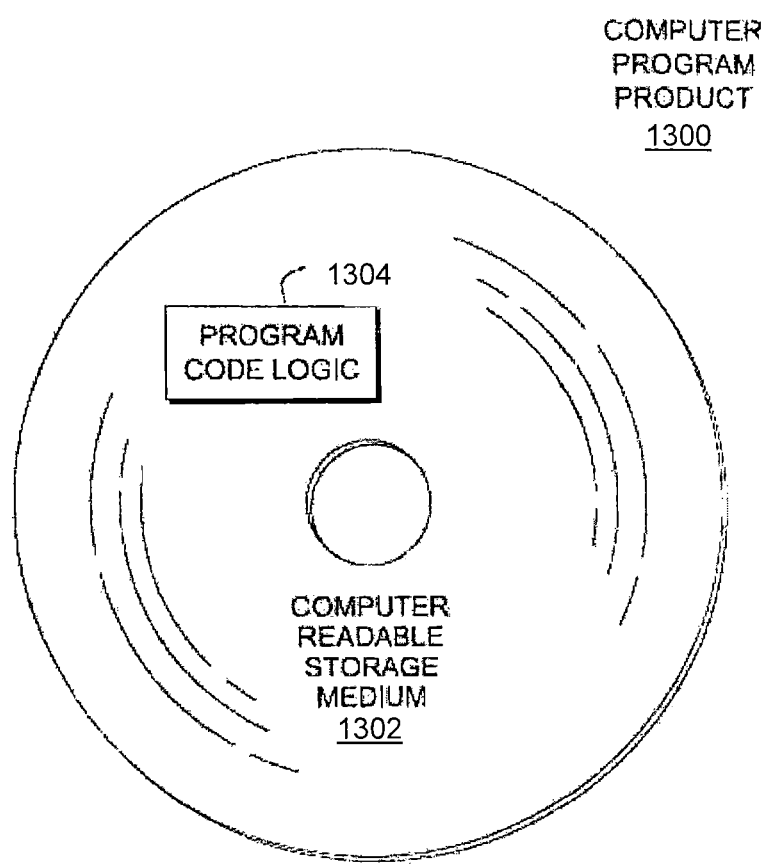
FIG. 13 depicts an embodiment of a computer program product incorporating one or more aspects of the present invention.

Computer-readable code or instructions need not reside on the enumerated computer systems 110, 130, and 140a-140n in FIG. 1. Referring to FIG. 13, in one example, a computer program product 1300 includes, for instance, one or more non-transitory computer readable storage media 1302 to store computer readable program code means or logic 1304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on one resource of a data processing and storage system, such as a cloud, partly on various resources, and/or partly on the EIR terminal and partly on one or more resources of the data processing and storage system.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A computer system for determining a newsworthiness score for a news story, the computer system comprising:
   one or more processors, one or more computer-readable memories and one or more computer-readable, tangible storage devices;
   program instructions, stored on at least one of the one or more storage devices for execution by at least one of the one or more processors via at least one of the one or more memories, to obtain data describing a news story from a client;
   program instructions, stored on at least one of the one or more storage devices for execution by at least one of the one or more processors via at least one of the one or more memories, to compare the data describing a news story to a set of pre-determined factors
   to locate at least one of the set of pre-determined factors in the data describing a news story; and
   program instructions, stored on at least one of the one or more storage devices for execution by at least one of the one or more processors via at least one of the one or more memories, responsive to locating the at least one of the set of pre-determined factors in the data describing a news story, to add at least one of a set of pre-calculated values to a running total,
      wherein each one of the set of pre-determined factors is assigned a respective one of the set of pre-calculated values and the at least one of the set of pre-calculated values added to the running total is a pre-calculated value associated with the at least one of the pre-determined factors located in the data, and
      wherein the running total comprises a newsworthiness score.

2. The computer system of claim 1, wherein each one of the set of pre-calculated values is comprised of a base value incremented by a calculated value, and
   wherein the calculated value for each one of the set of pre-calculated values is determined, for each one of the pre-determined factors, by locating a pre-determined factor in a data set, calculating a median value for the amount of times the pre-determined factor occurs in the data set, and assigning a number greater than zero to the calculated value if the pre-determined factor appears more than the median value.

3. The computer system of claim 2, wherein the data set comprises past news stories and media inquiries into the news stories.

4. The computer system of claim 2, wherein the set of pre-determined factors comprise: localization, policy effect, seasonal or timely, trend, follow up/analysis, conflict or controversy, impact or magnitude, unique, upcoming event, visual opportunity, known or distinguished personality, investigative or insider, proximity or location, milestone, report or policy brief, financial accountability, and governance.

5. The computer system of claim 2, wherein the set of pre-determined factors comprise: public official's comment, previous news story, national events, proactive outreach, annual, action by industry peer, action by other organization, government action, enterprise, and public filing.

6. The computer system of claim 2, further comprising:
   program instructions, stored on at least one of the one or more storage devices for execution by at least one of the one or more processors via at least one of the one or more memories, to flag two or more of the set of pre-determined factors; and
   program instructions, stored on at least one of the one or more storage devices for execution by at least one of the one or more processors via at least one of the one or more memories, responsive to locating the flagged set of pre-determined factors in the data, to multiply at least one of the set of pre-calculated values by a multiplier.

7. The computer system of claim 2, further comprising:
   program instructions, stored on at least one of the one or more storage devices for execution by at least one of the one or more processors via at least one of the one or more memories, to obtain a numerical value from the client representing the duration of a second news story; and
   program instructions, stored on at least one of the one or more storage devices for execution by at least one of the one or more processors via at least one of the one or more memories, in response to receiving the numerical value, to divide one pre-determined value by a divisor.

8. The computer system of claim 2, wherein the data describing a news story is solicited via a series of questions wherein each question had two possible answers.

9. The computer system of claim 2, wherein the data describing a news story comprises a raw data byte stream.

10. The computer system of 6, wherein the multiplier is derived using a coefficient and an $R^2$ value from a statistically significant multiple linear regression equation.

11. A method for determining a newsworthiness score for a news story, the method comprising:
   a computer obtaining data describing a news story from a client;
   the computer, responsive to receiving the data describing a news story, comparing the data describing a news story to a set of pre-determined factors;
   to locate at least one of the set of pre-determined factors in the data describing a news story; and
   the computer, responsive to locating the at least one of the set of pre-determined factors in the data describing a news story, adding at least one of a set of pre-calculated values to a running total,
      wherein each one of the set of pre-determined factors is assigned a respective one of the set of pre-calculated values and the at least one of the set of pre-calculated values added to the running total is a pre-calculated value associated with the at least one of the pre-determined factors located in the data,
      wherein each of the pre-calculated values comprises a base score incremented by a respective calculated value; and
      wherein the running total comprises a newsworthiness score.

12. The method of claim 11, further comprising:
   the computer calculating a median value for the amount of times each one of the set of pre-determined factors occurs in a data set;
   the computer assigning a calculated value of a number greater than zero to one of the set of pre-determined factors if the one of the set of pre-determined factors appears in the data set more than the median value for the one of the set of pre-determined factors; and the computer assigning a calculated value of zero to each one of the set of pre-determined factors if the pre-determined factor appears in the data set less than the median value for the one of the set of pre-determined factors.

13. The method of claim 12, wherein the data set comprises past news stories and media inquiries into the news stories.

14. The method of claim 13, wherein the set of pre-determined factors comprise: localization, policy effect, seasonal or timely, trend, follow up/analysis, conflict or controversy, impact or magnitude, unique, upcoming event, visual opportunity, known or distinguished personality, investigative or insider, proximity or location, milestone, report or policy brief, financial accountability, and governance.

15. The method of claim 13, wherein the set of pre-determined factors comprise: public official's comment, previous news story, national events, proactive outreach, annual, action by industry peer, action by other organization, government action, enterprise, and public filing.

16. The method of claim 12, further comprising:
the computer flagging two or more of the set of pre-determined factors; and
the computer, responsive to locating the flagging two or more of the set of pre-determined factors in the data, multiplying at least one of the set of pre-calculated values by a multiplier.

17. The method of claim 12, further comprising:
the computer receiving a numerical value from the client representing the duration of a second news story; and
the computer, responsive to receiving the numerical value, dividing at least one pre-determined value by a divisor.

18. The method of claim 12, further comprising:
the computer soliciting the data describing a news story via a series of questions wherein each question had two possible answers.

19. The method of claim 16, further comprising:
the computer deriving the multiplier using a coefficient and an $R^2$ value from a statistically significant multiple linear regression equation.

20. A computer program product for determining a newsworthiness score for a news story, the computer program product comprising:
one or more non-transitory computer-readable tangible storage devices readable by one or more processors;
program instructions, stored on at least one of the one or more storage devices, to obtain data describing a news story from a client;
program instructions, stored on at least one of the one or more storage devices, to compare the data describing a news story to a set of pre-determined factors
to locate at least one of the set of pre-determined factors in the data describing a news story; and
program instructions, stored on at least one of the one or more storage devices, responsive to locating the at least one of the set of pre-determined factors in the data describing a news story, to add at least one of a set of pre-calculated values to a running total,
wherein each one of set of pre-determined factors is assigned a respective one of the set of pre-calculated values and the at least one of the set of pre-calculated values added to the running total is a pre-calculated value associated with the at least one of the pre-determined factors located in the data, and
wherein the running total comprises a newsworthiness score.

21. The computer program product of claim 20, wherein each one of the set of pre-calculated values is comprised of a base value incremented by a calculated value,
wherein the calculated value for each one of the set of pre-calculated values is determined, for each one of the pre-determined factors, by locating the pre-determined factor in a data set, calculating a median value for the amount of times the pre-determined factor occurs in the data set, and assigning a number greater than zero to the calculated value if the pre-determined factor appears more than the median value.

22. The computer program product of claim 21, the set of pre-determined factors comprise: localization, policy effect, seasonal or timely, trend, follow up/analysis, conflict or controversy, impact or magnitude, unique, upcoming event, visual opportunity, known or distinguished personality, investigative or insider, proximity or location, milestone, report or policy brief, financial accountability, and governance.

23. The computer program product of claim 21, wherein the set of pre-determined factors comprise: public official's comment, previous news story, national events, proactive outreach, annual, action by industry peer, action by other organization, government action, enterprise, and public filing.

* * * * *